United States Patent [19]

Drescher

[11] Patent Number: 5,346,187
[45] Date of Patent: Sep. 13, 1994

[54] ROLL BELLOWS-TYPE PNEUMATIC SHOCK ABSORBER HAVING A REINFORCED ROLL BELLOWS

[75] Inventor: Gunter Drescher, Hanover, Fed. Rep. of Germany

[73] Assignee: Continental Aktiengesellschaft, Hanover, Fed. Rep. of Germany

[21] Appl. No.: 923,001

[22] Filed: Jul. 30, 1992

Related U.S. Application Data

[63] Continuation of Ser. No. 670,308, Mar. 15, 1991, abandoned.

[30] Foreign Application Priority Data

Mar. 24, 1990 [DE] Fed. Rep. of Germany ....... 4009495

[51] Int. Cl.$^5$ ............................................. F16F 9/04
[52] U.S. Cl. ............................ 267/64.11; 267/64.27; 267/122
[58] Field of Search ................ 267/122, 118, 33, 148, 267/149, 64.11–64.28; 188/298; 92/98 D, 103 F, 103 R, 103.5 D; 280/711, 712

[56] References Cited

U.S. PATENT DOCUMENTS

| | | | |
|---|---|---|---|
| 894,117 | 7/1908 | Clark | 267/64.24 |
| 2,056,106 | 9/1936 | Kuhn | 267/64.27 X |
| 2,920,885 | 1/1960 | Niclas | 267/64.27 |
| 2,925,265 | 2/1960 | Nassimbene | 267/64.24 |
| 2,960,333 | 11/1960 | McGavern, Jr. et al. | 267/64.24 |
| 2,999,681 | 9/1961 | Müller et al. | 267/64.27 |
| 3,033,558 | 5/1962 | Slemmons et al. | 267/64.27 |
| 3,305,228 | 2/1967 | Steck et al. | 267/33 X |
| 3,319,952 | 5/1967 | Travers | 267/64.27 |
| 3,438,309 | 4/1969 | Boileau | 92/103 R |
| 3,513,059 | 5/1970 | Prohaska | 92/103 F X |
| 3,549,142 | 12/1970 | Tilton | 267/64.24 |
| 3,627,297 | 12/1971 | Gaydecki | 267/64.24 X |
| 3,667,707 | 6/1972 | Mui | 267/122 X |
| 3,682,464 | 8/1972 | Krejcir | 267/64.24 |
| 3,870,286 | 3/1975 | Willich | 267/64.24 |
| 3,897,941 | 8/1975 | Hirtreiter et al. | 267/64.24 |
| 4,489,474 | 12/1984 | Brown et al. | 267/64.24 |
| 4,643,407 | 2/1987 | Zirk | 267/122 X |
| 4,722,516 | 2/1988 | Gregg | 267/64.27 |
| 4,741,517 | 5/1988 | Warmuth, II et al. | 267/64.27 X |
| 4,763,883 | 8/1988 | Crabtree | 267/64.27 |
| 4,787,608 | 11/1988 | Elliott | 267/64.19 X |
| 4,807,858 | 2/1989 | Watanabe et al. | |
| 4,988,082 | 1/1991 | Pees | 267/64.27 X |

FOREIGN PATENT DOCUMENTS

| | | | |
|---|---|---|---|
| 1908373 | 9/1970 | Fed. Rep. of Germany | 267/64.27 |
| 2050613 | 4/1972 | Fed. Rep. of Germany | 267/64.27 |
| 2064751 | 8/1972 | Fed. Rep. of Germany | 267/64.27 |
| 2515254 | 4/1975 | Fed. Rep. of Germany | . |
| 2904521 | 2/1979 | Fed. Rep. of Germany | . |
| 2905791 | 8/1980 | Fed. Rep. of Germany | 267/64.24 |
| 2515295 | 4/1983 | France | 267/122 |
| 0143834 | 11/1981 | Japan | 267/122 |
| 0167943 | 7/1987 | Japan | 267/64.27 |
| 0035136 | 2/1989 | Japan | 267/64.27 |
| 879704 | 10/1961 | United Kingdom | 267/64.27 |

*Primary Examiner*—Douglas C. Butler
*Attorney, Agent, or Firm*—Robert W. Becker

[57] ABSTRACT

A roll bellows-type pneumatic shock absorber comprises a roll bellows having a wall made of an elastomeric material with embedded stiffening layers. Both end sections of the roll bellows are fastened to a respective fixture. During normal operational conditions the roll bellows forms the rolling crease that changes with the shock absorbing movements. In order to reduce the technical expenditure during the manufacture and mounting of the pneumatic shock absorber and in order to provide a light weight roll bellows, one end section of the roll bellows is embodied as an additionally reinforced roll bellows wall section, which is inherently stable with respect to the inner pressure of the pneumatic shock absorber and the outer loads exerted via the rolling crease. Thus, the roll bellows rolls with its rolling crease over the reinforced roll bellows wall section, i.e., over itself.

13 Claims, 3 Drawing Sheets

ROLL BELLOWS-TYPE PNEUMATIC SHOCK ABSORBER HAVING A REINFORCED ROLL BELLOWS

This application is a continuation of application Ser. No. 670,308 filed Mar. 15, 1991, now abandoned.

BACKGROUND OF THE INVENTION

The present invention relates to a roll bellows-type pneumatic shock absorber having a roll bellows comprising a wall made of an elastomeric material with embedded stiffening layers, whereby the roll bellows is fastened to a fixture with both end sections and forms a rolling crease during shock absorbing movements.

Roll bellows-type pneumatic shock absorbers are known in a variety of designs and have been successfully employed especially for shock absorbing functions for axles of trucks and buses. The roll bellows, with at least one end thereof, are fastened to the rolling piston, whereby the rolling piston is usually made of metal or plastic materials. In an operating mode, the rolling piston is moved inside the roll bellows, so that the roll bellows is inverted and forms a rolling crease which in turn rolls on the outer mantle surface of the rolling piston. The manufacture and mounting of the rolling piston requires a great technical expenditure. The rolling piston increases the total weight of the roll bellows-type pneumatic shock absorber. Endeavors to reduce the weight of the roll bellows-type pneumatic shock absorber resulted in the use of lighter materials for the rolling piston and also in different constructive designs.

It is therefore an object of the present invention to provide a roll bellows-type pneumatic shock absorber of the aforementioned kind, which is light-weight and which requires less technical expenditure with respect to manufacture and mounting.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
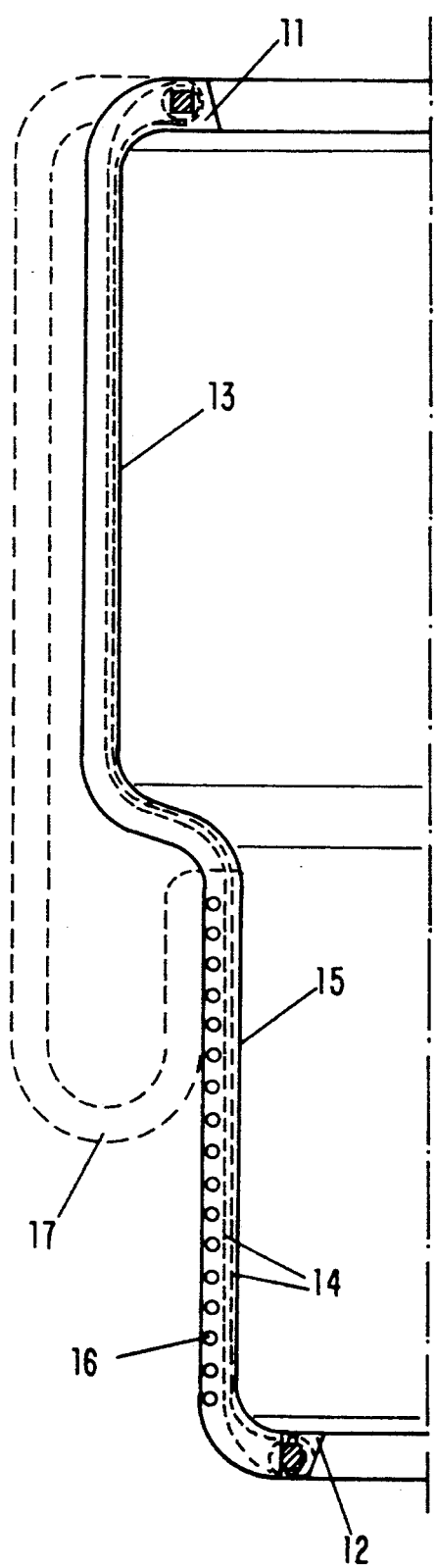
FIG. 1 is a partial cross section of a roll bellows having fastening beads at both ends.

The roll bellows-type pneumatic shock absorber of the present invention is primarily characterized by at least one of the end sections of the roll bellows having a roll bellows wall section that is provided with further reinforcement means so as to be inherently stable with respect to the inner pressure of the pneumatic shock absorber and with respect to outer loads exerted by the rolling crease.

The inherently stable roll bellows wall section of the roll bellows takes over the function of the conventionally used rolling piston. Due to suitable reinforcement means, the roll bellows wall sections, during shock absorbing movements of the pneumatic shock absorber, remain inherently stable under pressure loads. The flexible roll bellows rolls over the reinforced roll bellows wall section which thus essentially represents an integrated rolling piston. The roll bellows essentially rolls on itself. The rolling crease of the roll bellows is supported at the reinforced roll bellows wall section.

Due to the design of the present invention the portion of fixture parts of the pneumatic shock absorber that are difficult to manufacture and to mount is thus reduced. Only one base plate for the fastening of the reinforced roll bellows wall section is necessary. Due to suitably embodied reinforcement means it is possible to provide the roll bellows wall section with an outer contour that deviates from the conventionally used cylindrical shape.

In a preferred embodiment of the present invention the two end sections of the roll bellows have a roll bellows wall section that is provided with the further reinforcement. This embodiment corresponds to a pneumatic shock absorber having a double piston.

In another embodiment of the present invention the length of the reinforced roll bellows wall section corresponds to at least the travel stroke of the pneumatic shock absorber. Due to this design the rolling crease, during a shock absorbing movement, rolls on the reinforced wall section.

In a further preferred embodiment of the present invention the roll bellows wall section comprises a helically wound wire core layer that is embedded in the elastomeric material of the roll bellows wall.

The helically wound wire cord layer may be easily introduced during the manufacturing process by simply winding it onto the base structure. Also, wire cord is known to provide a good connection to elastomeric materials.

In a further reinforcement design for the roll bellows wall section, a cylindrical metal sleeve is embedded in the elastomeric material of the roll bellows wall. By providing a suitable shape to the sleeve, a desired outer contour of the reinforced roll bellows wall section may be provided in a simple and advantageous manner.

Roll bellows-type pneumatic shock absorbers usually comprise a roll bellows that is provided with stiffening layers in the form of fabric layers over the entire length of the roll bellows. These fabric layers are comprised of textile cords whereby the individual cords of one layer cross the individual cords of the other layer. According to a further embodiment of the present invention a roll bellows wall section is provided with a reinforcement means in the form of a third fabric layer that is arranged between the first and the second fabric layer, whereby textile cords of the third fabric layer are arranged, in an axial direction or in a peripheral direction of the roll bellows, at an angle different from the angle of the textile cords of the first and the second fabric layers. With this embodiment, the conventionally occurring changes of the fabric layer angles due to the constantly moving pneumatic shock absorber are suppressed. By preventing these changes of the fabric layer angles the inherent stability of the roll bellows wall sections is improved.

In a further advantageous embodiment of the present invention a guide ring is arranged inside the roll bellows wall which is placed between an end section of the roll bellows wall section and the adjacent roll bellows main body. By providing a guide ring, a defined pivoting point for the rolling crease of the roll bellows is provided. The guide ring may be embedded in the roll bellows wall or may be vulcanized to the outer mantle surface of the roll bellows wall.

According to a further embodiment, an inner support ring is provided in area of the roll bellows wall section, with an annular wall thereof resting at the roll bellows wall section. This support ring provides further stiffening of the roll bellows wall section.

Preferably an outer mantle surface of the roll bellows wall section is provided with a friction reducing coating. Advantageously, the roll bellows wall section, at a free end thereof, is provided with a fastening protrusion that is engaged by a flange of the fixture.

The present invention provides a roll bellows for a roll bellows-type pneumatic shock absorber whereby a rolling crease rolls over the reinforced roll bellows wall section, that is, rolls on itself. The length of the reinforced roll bellows wall section is determined and adjusted according to the specific requirements and desired functions of the roll bellows-type pneumatic shock absorber.

DESCRIPTION OF PREFERRED EMBODIMENTS

The present invention will now be described in detail with the aid of several specific embodiments utilizing FIGS. 1 through 6.

The roll bellows represented in FIG. 1 has a reduced diameter at its ends and is provided with fastening beads 11 and 12. The solid-line representation of the roll bellows contour corresponds to the manufacturing contour. The rolling contour during shock absorbing movements of the pneumatic shock absorber are represented by a dash-dotted line. The roll bellows wall 13 of the roll bellows has a uniform thickness over the entire length of the roll bellows. Two stiffening layers 14 are embedded in the roll bellows wall 13. At the lower end section the roll bellows is provided with a reinforced roll bellows wall section 15. In addition to the continuous stiffening layers 14 a helically wound wire cord layer 16 is provided in this section of the roll bellows wall whereby the two stiffening layers 14 are enclosed by the wire cord layer 16.

During operation the roll bellows-type pneumatic shock absorber forms the rolling crease 17 which, during the shock absorbing movements, rolls on the inherently stable roll bellows wall section 15.

Figure 2:
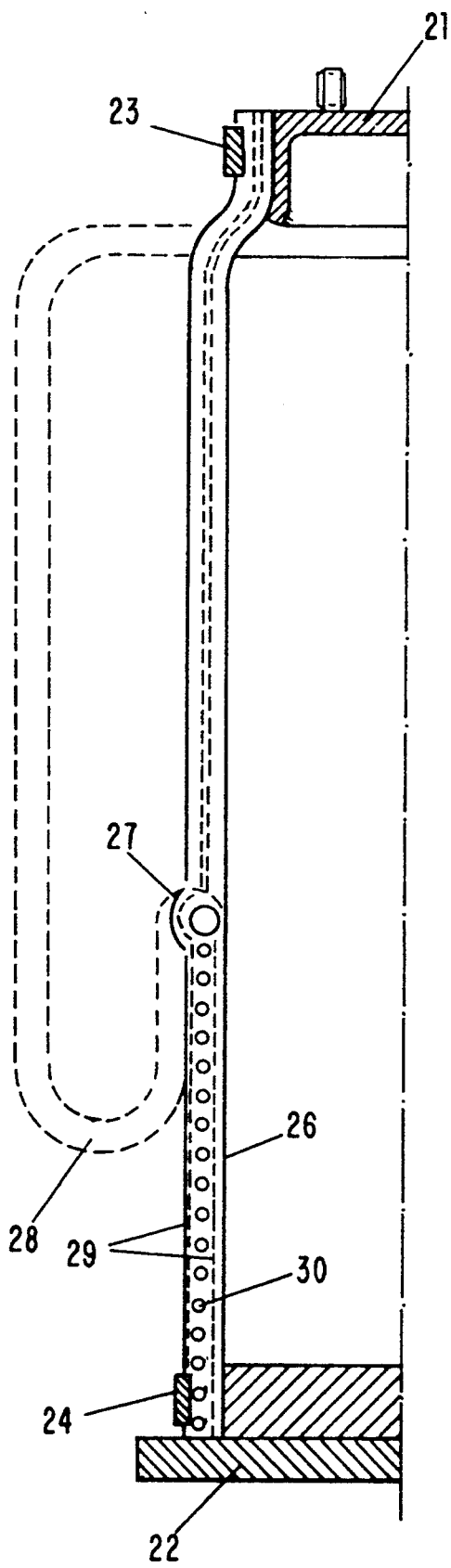
FIG. 2 shows a partial cross section of the hose-type roll bellows that, with its ends, is fastened to a fixture via clamping rings.

The embodiment according to FIG. 2 comprises a hose-type roll bellows which is clamped at its end sections between two fastening flanges 21 and 22 and respective clamping rings 23 and 24 that are slipped over. The inherently stable reinforced roll bellows wall section 26 is delimited relative to the main body of the roll bellows by a guide ring 27 that is embedded into the roll bellows wall. The guide ring 27 forms the border between the roll bellows wall section 26 and the main body of the hose-type roll bellows. Between the two stiffening layers 29 a helically wound wire cord layer 30 is arranged. During operation of the pneumatic shock absorber a rolling crease 28 is formed in a defined manner at the guide ring 27.

Figure 3:
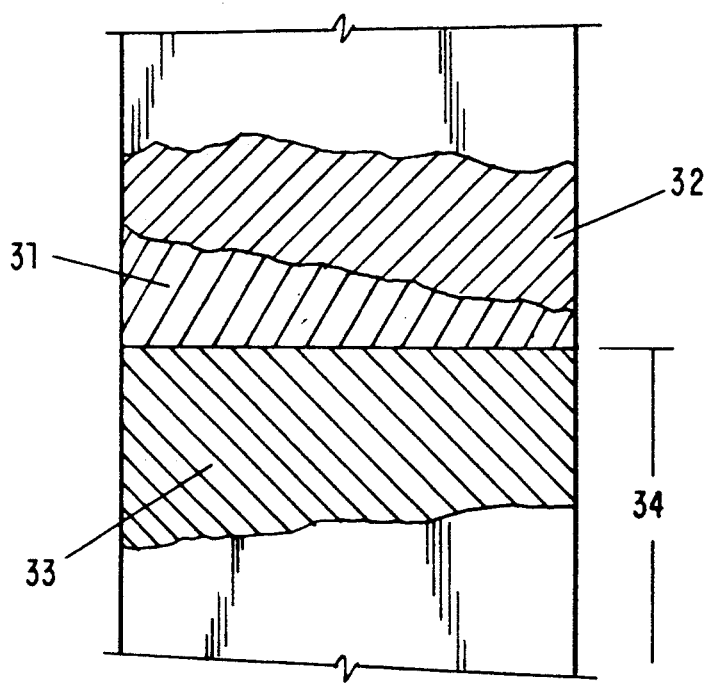
FIG. 3 is a schematical representation of the fabric layers in the reinforced roll bellows wall section.
Figure 4:
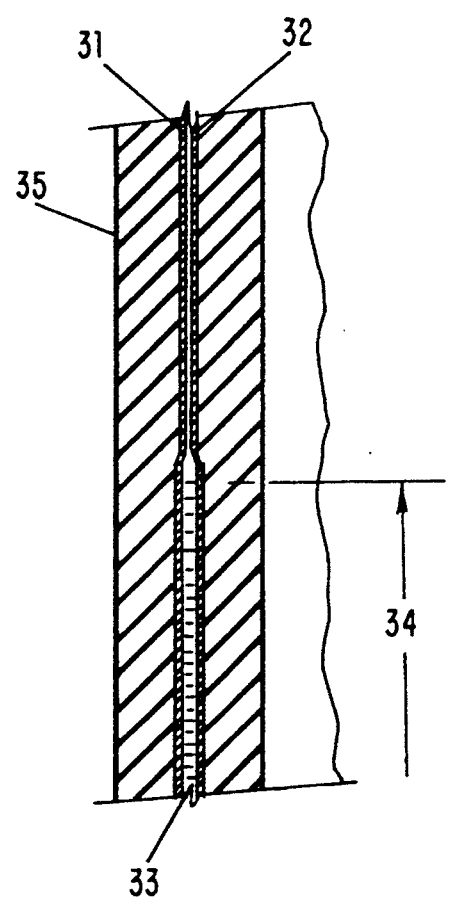
FIG. 4 is an enlarged representation of a longitudinal cross section of the wall of the roll bellows wall section of FIG. 3.

FIG. 3 schematically represents the two textile fabric layers 31 and 32 that are used as stiffening layers in the roll bellows wall which are arranged such that the cords of one layer cross the cords of the other layer. The angle between the cords of the fabric layers is approximately 40° to 80° with respect to a peripheral direction. The angle of the cords of the two textile fabric layers 31 and 32 that are crossing each other is of great importance for the properties of the pneumatic shock absorber. With the angle of the cords the load carrying capacity and the lateral force may be adjusted. Conventionally, two continuous fabric layers are employed, but it is also possible to use four or more fabric layers. Between these two fabric layers a third fabric layer 33 is embedded the cords of which are arranged in a peripheral direction. The third fabric layer 33 is restricted to a roll bellows wall section 34 at one end of the roll bellows. The wall 35 of the reinforced roll bellows wall section 34 is embodied in an inherently stable manner due to the arrangement of three fabric layers (FIG. 4)

Figure 5:
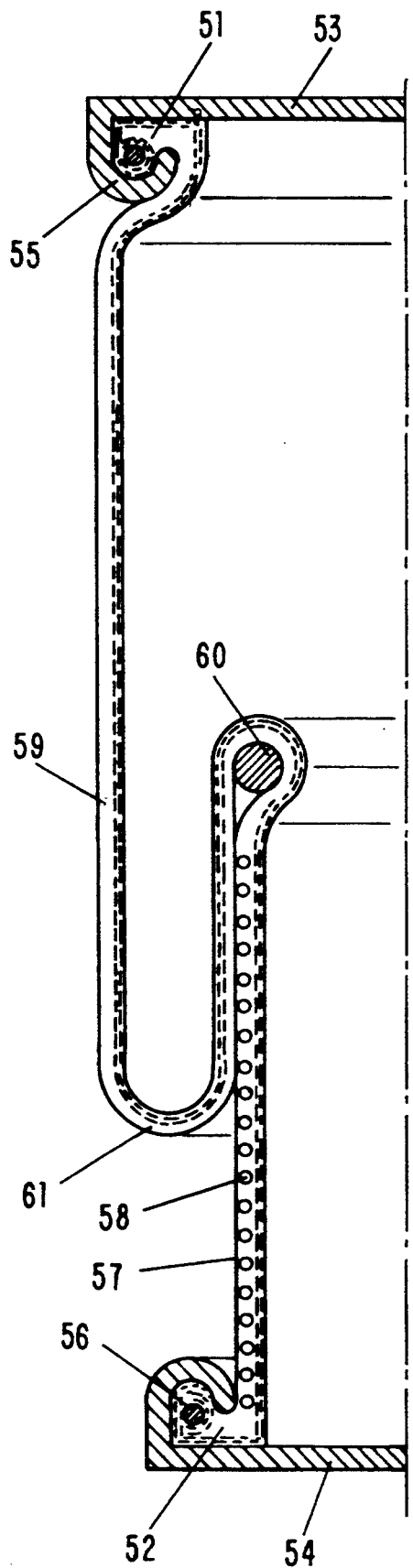
FIG. 5 shows a roll bellows that is clamped between two fastening flanges and has a guide ring.

FIG. 5 represents a roll bellows in its operational position. The roll bellows is clamped with two fastening beads 51 and 52 at two fastening fixtures 53 and 54 via flanges 55 and 56. When viewed from the lower clamping at 52 and 56 an inherently stable roll bellows wall section 57 extends in an upward direction whereby the roll bellows wall section 57 is provided with a reinforcement due to a wound wire cord layer 58. At the end of the inherently stable roll bellows wall section 57 a guide ring 60 is vulcanized to the outer surface of the roll bellows wall 59. This guide ring 60 defines the beginning of the rolling crease 61 which is created during shock absorbing movements of the pneumatic shock absorber.

Figure 6:
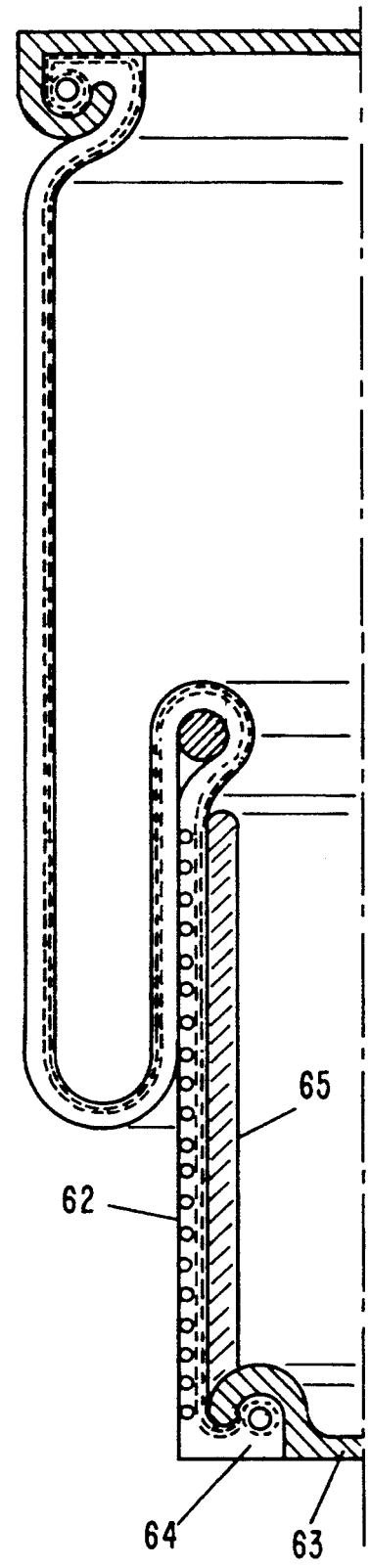
FIG. 6 shows a clamped roll bellows with a support ring in the area of the reinforced roll bellows wall section.

The embodiment shown in FIG. 6 differs from the embodiment of FIG. 5 by having its lower end clamped to a fastening flange 63 via an inner fastening bead 64. The inherently stable roll bellows wall section 62 is additionally supported by an inner supporting ring 65.

The present invention is, of course, in no way restricted to the specific disclosure of the specification and drawings, but also encompasses any modifications within the scope of the appended claims.

What I claim is:

1. A roll bellows-type pneumatic shock absorber without a rolling piston comprising:
    a roll bellows comprising a roll bellows wall made of an elastomeric material with imbedded first reinforcement layers, said roll bellows wall having a first and a second end section, with a main body of said roll bellows wall extending between said first and said second end sections;
    a first and a second fixture, said first end section connected to said first fixture and said second end section connected to said second fixture;
    said first end section comprising a second imbedded reinforcement layer for additionally stiffening said first end section to form a stiffened roll bellows wall section;
    during shock absorbing movements, said main body forming a rolling lobe and said stiffened roll bellows wall section remaining stable under pressure loads occurring during the shock absorbing movements, said rolling lobe rolling on and supported at said stiffened roll bellows wall section.

2. A roll bellows-type pneumatic shock absorber according to claim 1, in which both of said end sections have a roll bellows wall section that is provided with said further reinforcement means.

3. A roll bellows-type pneumatic shock absorber according to claim 1, in which a length of said roll bellows wall section, in an axial direction thereof, corresponds to at least a travel stroke of said roll bellows-type shock absorber.

4. A roll bellows-type pneumatic shock absorber according to claim 1, in which said reinforcement layer of said roll bellows wall section comprises a helically wound wire cord layer that is imbedded in said elastomeric material.

5. A roll bellows-type pneumatic shock absorber according to claim 1, in which said reinforcement means of said roll bellows wall section comprises a cylindrical metal sleeve that is imbedded in said elastomeric material.

6. A roll bellows-type pneumatic shock absorber according to claim 1, in which said stiffening layers in the form of two fabric layers are imbedded over an entire length of said roll bellows wall, in a direction of a longitudinal axis thereof, said fabric layers comprising textile cords that are arranged at a first angle relative to said longitudinal axis, with said textile cords of a first one of said fabric layers crossing said textile cords of a second one of said fabric layers, with said reinforcement means of said roll bellows wall section being a third fabric layer that is arranged between said first and said second fabric layer, whereby textile cords of said third fabric layer are arranged at a second angle different from said first angle of said textile cords of said first and second fabric layers.

7. A roll bellows-type pneumatic shock absorber according to claim 6, in which said textile cords of said third fabric layer are arranged in an axial direction of said roll bellows.

8. A roll bellows-type pneumatic shock absorber according to claim 6, in which said textile cords of said third fabric layer are arranged in a peripheral direction of said roll bellows.

9. A roll bellows-type pneumatic shock absorber according to claim 1, in which between an end section of said roll bellows wall section and an adjacent roll bellows main body a guide ring is arranged inside said roll bellows wall.

10. A roll bellows-type pneumatic shock absorber according to claim 1, in which between said roll bellows wall section and said main body a guide ring is arranged at an outer mantle surface of said roll bellows wall.

11. A roll bellows-type pneumatic shock absorber according to claim 1, in which an inner support ring is provided in an area of said roll bellows wall section, with an annular wall of said support ring resting against said roll bellows wall section.

12. A roll bellows-type pneumatic shock absorber according to claim 1, in which an outer mantle surface of said roll bellows wall section is provided with a friction reducing coating.

13. A roll bellows-type pneumatic shock absorber according to claim 1, in which said roll bellows all section at a free end thereof, corresponding to one of said two end sections, is provided with a fastening protrusion that is engaged by a flange of said respective fixture.

* * * * *